US012025142B2

(12) United States Patent
Yasuda

(10) Patent No.: US 12,025,142 B2
(45) Date of Patent: Jul. 2, 2024

(54) VACUUM PUMP

(71) Applicant: SHIMADZU CORPORATION, Kyoto (JP)

(72) Inventor: Tomoki Yasuda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/686,509

(22) Filed: Mar. 4, 2022

(65) Prior Publication Data

US 2022/0316484 A1 Oct. 6, 2022

(30) Foreign Application Priority Data

Apr. 2, 2021 (JP) ................................ 2021-063380

(51) Int. Cl.
*F04D 19/04* (2006.01)
*F04D 29/02* (2006.01)
*F04D 29/52* (2006.01)

(52) U.S. Cl.
CPC ......... *F04D 19/042* (2013.01); *F04D 29/023* (2013.01); *F04D 29/522* (2013.01); *F05D 2300/17* (2013.01)

(58) Field of Classification Search
CPC .... F04D 19/042; F04D 29/023; F04D 29/522; F04D 19/044; F04D 19/04; F04D 29/582
See application file for complete search history.

(56) References Cited

U.S. PATENT DOCUMENTS 4,787,829 A * 11/1988 Miyazaki .............. F04D 19/048 417/423.4
5,924,841 A * 7/1999 Okamura .............. F04D 19/046 415/176
11,078,916 B2 * 8/2021 Hofmann .............. F04D 27/001
2003/0129053 A1 * 7/2003 Nonaka ................. F04D 29/584 415/90
2017/0002832 A1 * 1/2017 Nonaka ................. F04D 29/545

FOREIGN PATENT DOCUMENTS

JP 2017002856 A 1/2017

* cited by examiner

*Primary Examiner* — Brian Christopher Delrue
(74) *Attorney, Agent, or Firm* — Renner, Otto, Boisselle & Sklar, LLP

(57) ABSTRACT

A vacuum pump comprises: a rotor having multiple stages of rotor blades and a rotor cylindrical portion; a stator having multiple stages of stator blades and a stator cylindrical portion; a base housing the rotor and the stator; and a cover member configured to cover an inner wall portion of the base forming an internal space positioned on a gas-discharge downstream side with respect to gas-discharge-downstream-side end portions of the rotor cylindrical portion and the stator cylindrical portion. An inner peripheral side end of the cover member extends from the internal space to a position overlapping with an inner peripheral surface of the rotor cylindrical portion.

8 Claims, 6 Drawing Sheets

VACUUM PUMP

BACKGROUND OF THE INVENTION

1. Technical Field

The present invention relates to a vacuum pump.

2. Background Art

Vacuum pumps include one including a turbine blade pump portion formed by stationary blades and rotor blades and a drag pump portion provided on a gas-discharge downstream side with respect to the turbine blade pump portion. Such a vacuum pump is used for the technique of bringing the inside of a process chamber, in which a process such as dry etching or chemical vapor deposition (CVD) is executed, into a high vacuum state, for example.

The above-described process is executed in such a manner that gas is supplied into the process chamber. For this reason, there is a probability that a reactive product is generated and accumulated on a gas-contacting surface of the vacuum pump when the vacuum pump discharges such gas. The reactive product accumulated on the gas-contacting surface needs to be removed.

Thus, in a vacuum pump of Patent Literature 1 (JP-A-2017-2856), a protection member is provided on a gas-contacting surface of a gas discharge path of the vacuum pump to prevent accumulation of a product on the vacuum pump. Accordingly, the necessity of replacement of a component of the vacuum pump is omitted, and a vacuum pump maintenance cost is reduced.

SUMMARY OF THE INVENTION

In the above-described vacuum pump, there is a clearance between a gas-discharge-downstream-side end portion of a rotor cylindrical portion forming a drag pump portion and an end portion of the protection member. Thus, gas discharged from the drag pump portion enters, in some cases, a space between the rotor cylindrical portion and a base and/or a space between the protection member and the base. As a result, in a case where a base temperature is low, a reactive product is generated on the base. Moreover, in some cases, the reactive product generated on the base is detached and discharged into the gas discharge path. An object of the present invention is to reduce a discharged gas flow into the space between the rotor cylindrical portion and the base and/or the space between the protection member and the base to reduce generation of the reactive product on a member of the vacuum pump, such as the base.

A vacuum pump comprises: a rotor having multiple stages of rotor blades and a rotor cylindrical portion; a stator having multiple stages of stator blades and a stator cylindrical portion; a base housing the rotor and the stator; and a cover member configured to cover an inner wall portion of the base forming an internal space positioned on a gas-discharge downstream side with respect to gas-discharge-downstream-side end portions of the rotor cylindrical portion and the stator cylindrical portion. An inner peripheral side end of the cover member extends from the internal space to a position overlapping with an inner peripheral surface of the rotor cylindrical portion.

The inner peripheral side end of the cover member extends from an internal space to a position overlapping with the inner peripheral surface of the rotor cylindrical portion. This can reduce gas discharged by the rotor and the stator from entering a space between the rotor cylindrical portion and the base and/or the space between the cover member and the base. As a result, generation of a reactive product on the base can be reduced.

DETAILED DESCRIPTION OF THE EXEMPLARY EMBODIMENTS

Figure 1:
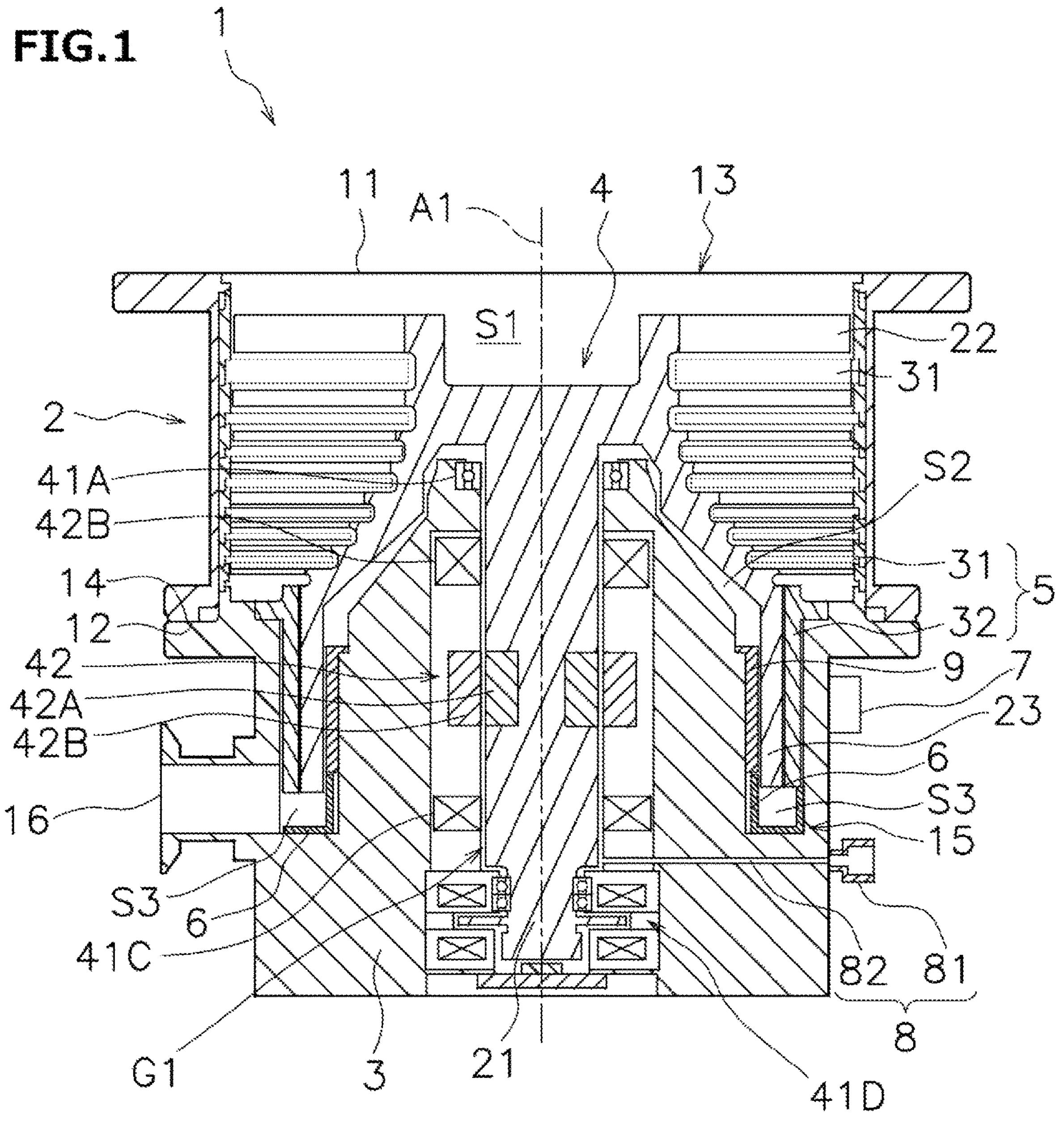
FIG. 1 is a sectional view of a vacuum pump according to an embodiment.

Hereinafter, a vacuum pump according to one embodiment will be described with reference to the drawings. FIG. 1 is a sectional view of a vacuum pump 1 according to the embodiment. As shown in FIG. 1, the vacuum pump 1 includes a housing 2, a base 3, a rotor 4, and a stator 5.

The housing 2 includes a first end portion 11, a second end portion 12, and a first internal space S1. A suction port 13 is provided at the first end portion 11. The first end portion 11 is attached to an attachment target (not shown). The attachment target is, for example, a process chamber of a semiconductor manufacturing device. The first internal space S1 communicates with the suction port 13. The second end portion 12 is positioned opposite to the first end portion 11 in an axial direction (hereinafter merely referred to as an "axial direction A1") of the rotor 4. The second end portion 12 is connected to the base 3. The base 3 includes a base end portion 14. The base end portion 14 is connected to the second end portion 12 of the housing 2.

The rotor 4 includes a shaft 21. The shaft 21 extends in the axial direction A1. The shaft 21 is rotatably housed in the base 3. A first gap G1 is formed between the shaft 21 and the base 3. Moreover, a second internal space S2 is formed between an inner wall portion of the rotor 4 and the base 3.

The rotor 4 includes multiple stages of rotor blades 22 and a rotor cylindrical portion 23. The multiple stages of the rotor blades 22 are connected to the shaft 21. The multiple rotor blades 22 are arranged at intervals in the axial direction A1. Although not shown in the figure, the multiple stages of the rotor blades 22 radially extend about the shaft 21. Note that in the drawing, a reference numeral is assigned only to one of the multiple stages of the rotor blades 22 and reference numerals for the other rotor blades 22 are omitted. The rotor cylindrical portion 23 is arranged below the multiple stages of the rotor blades 22. The rotor cylindrical portion 23 extends in the axial direction A1.

The stator 5 includes multiple stages of stator blades 31 and a stator cylindrical portion 32. The multiple stages of the stator blades 31 are connected to an inner surface of the housing 2. The multiple stages of the stator blades 31 are arranged at intervals in the axial direction A1. Each of the multiple stages of the stator blades 31 is arranged between adjacent ones of the multiple stages of the rotor blades 22. Although not shown in the figure, the multiple stages of the stator blades 31 radially extend about the shaft 21. Note that in the drawing, reference numerals are assigned only to two of the multiple stages of the stator blades 31 and reference numerals for the other stator blades 31 are omitted. The stator cylindrical portion 32 is fixed with the stator cylindrical portion 32 thermally contacting the base 3. The stator cylindrical portion 32 is, in a radial direction of the rotor cylindrical portion 23, arranged to face the rotor cylindrical portion 23 through a slight clearance. A spiral groove is provided at an inner peripheral surface of the stator cylindrical portion 32.

As shown in FIG. 1, an inner wall portion 15 of the base 3 forms a third internal space S3 further on a downstream side with respect to gas-discharge-downstream-side end portions of the rotor cylindrical portion 23 and the stator cylindrical portion 32. Gas discharged from the attachment target and later-described purge gas are discharged into the third internal space S3. The third internal space S3 communicates with an exhaust port 16. The exhaust port 16 is provided at the base 3. Another vacuum pump (not shown) is connected to the exhaust port 16. Note that a gas-discharge downstream side indicates a side closer to the third internal space S3 in the axial direction A1. Moreover, a gas-discharge downstream direction indicates a direction toward the third internal space S3.

The vacuum pump 1 includes multiple bearings 41A to 41D and a motor 42. The multiple bearings 41A to 41D are attached to such positions in the base 3 that the shaft 21 is housed. The multiple bearings 41A to 41D rotatably support the rotor 4. The bearing 41A is, for example, a ball bearing. On the other hand, the other bearings 41B to 41D are, for example, magnetic bearings. Note that the multiple bearings 41B to 41D may be other types of bearings such as ball bearings.

The motor 42 rotatably drives the rotor 4. The motor 42 includes a motor rotor 42A and a motor stator 42B. The motor rotor 42A is attached to the shaft 21. The motor stator 42B is attached to the base 3. The motor stator 42B is arranged to face the motor rotor 42A.

In the vacuum pump 1, the multiple stages of the rotor blades 22 and the multiple stages of the stator blades 31 form a turbo-molecular pump portion. Moreover, the rotor cylindrical portion 23 and the stator cylindrical portion 32 form a screw groove pump portion. In the vacuum pump 1, the rotor 4 is rotated by the motor 42, and accordingly, gas flows into the first internal space S1 through the suction port 13. The gas in the first internal space S1 passes through the turbo-molecular pump portion and the screw groove pump portion, and then, is discharged into the third internal space S3. The gas in the third internal space S3 is discharged through the exhaust port 16. As a result, the inside of the attachment target attached to the suction port 13 is brought into a high vacuum state.

In a case where a process such as dry etching or CVD is executed in the attachment target attached to the suction port 13, the vacuum pump 1 discharges gas (referred to as "process gas") used for such a process. Accordingly, in a gas discharge path of the vacuum pump 1, a reactive product is generated from a raw material, i.e., the process gas, in some cases. For this reason, in the present embodiment, a cover member 6 is provided in the third internal space S3 forming the gas discharge path of the vacuum pump 1, thereby reducing generation of the reactive product on the base 3 forming the vacuum pump 1. Hereinafter, the configuration of the cover member 6 will be specifically described.

Figure 2A:
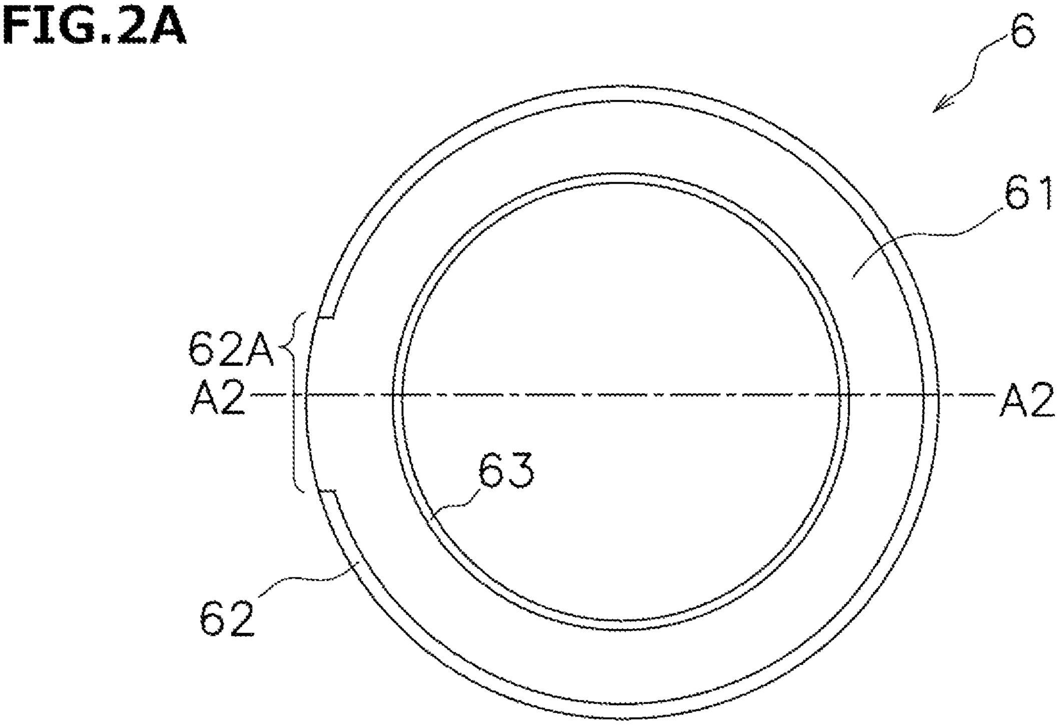
FIG. 2A is a plan view of a cover member.
Figure 2B:
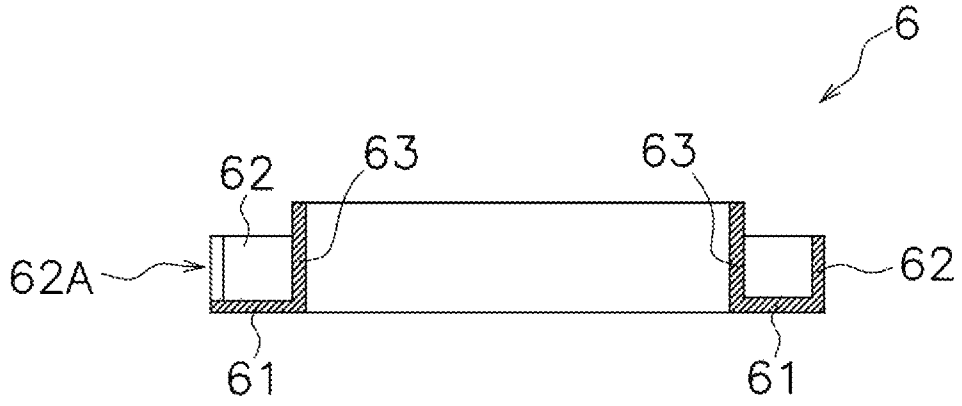
FIG. 2B is a sectional view of the cover member along an A2-A2 line.
Figure 3:
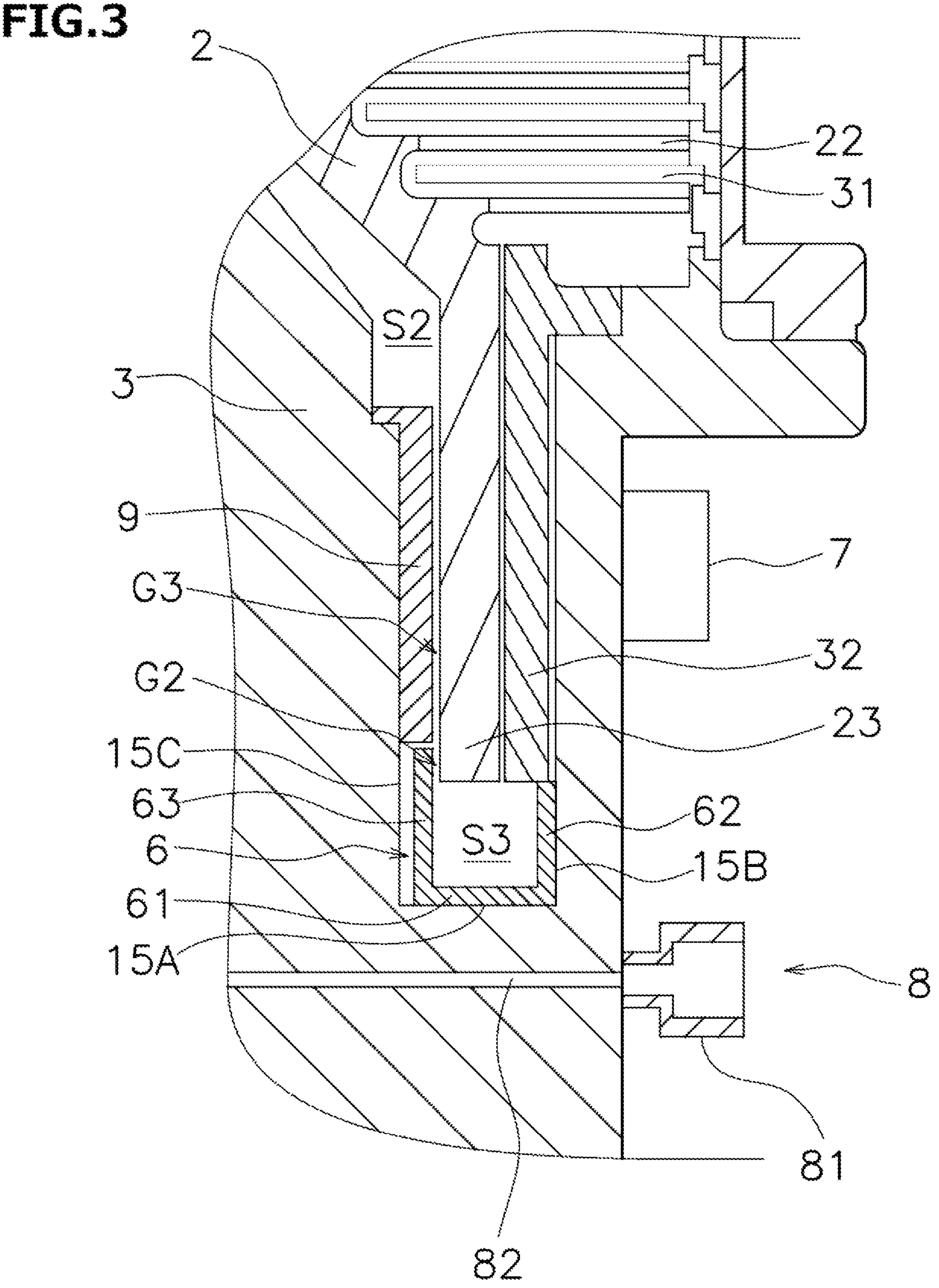
FIG. 3 is an enlarged view of the vicinity of a rotor cylindrical portion and a stator cylindrical portion.

FIG. 2A is a plan view of the cover member 6. FIG. 2B is a sectional view of the cover member 6 along an A2-A2 line. FIG. 3 is an enlarged view of the vicinity of the rotor cylindrical portion 23 and the stator cylindrical portion 32. The cover member 6 includes a first portion 61, a second portion 62, and a third portion 63. The first portion 61 is a ring-shaped planar member. When the cover member 6 is arranged in the third internal space S3, the first portion 61 covers a bottom surface 15A of the inner wall portion 15 of the base 3. Note that the cover member 6 is fixed to the base 3 in such a manner that the first portion 61 and the bottom surface 15A of the base 3 are fixed to each other with bolts. Thus, the cover member 6 can be easily attached to or detached from the base 3.

The second portion 62 is a ring-shaped wall portion, and is continuously connected to an outer peripheral side of the first portion 61. When the cover member 6 is arranged in the third internal space S3, the second portion 62 covers an outer wall surface 15B of the inner wall portion 15 of the base 3. The third portion 63 is a ring-shaped wall portion, and is continuously connected to an inner peripheral side of the first portion 61. When the cover member 6 is arranged in the third internal space S3, the third portion 63 covers an inner wall surface 15C of the inner wall portion 15 of the base 3.

A clearance between each of the first portion 61, the second portion 62, and the third portion 63 and the inner wall portion 15 of the base 3 covered with these portions is set as small as possible. With this configuration, accumulation of the reactive product on the inner wall portion 15 of the base 3 covered with the first portion 61, the second portion 62, and the third portion 63 can be reduced as much as possible.

As shown in FIGS. 2A and 2B, a cutout portion 62A is formed at part of the second portion 62. When the cover member 6 is arranged in the third internal space S3, the cutout portion 62A faces the exhaust port 16 (FIG. 1). Gas discharged to an exhaust side of the screw groove pump portion formed by the rotor cylindrical portion 23 and the stator cylindrical portion 32 flows into the third internal space S3, and thereafter, is discharged from the exhaust port 16 through the cutout portion 62A.

The cover member 6 is formed in such a manner that, e.g., a plate member of aluminum alloy or stainless steel is bent. Alternatively, the first portion 61, the second portion 62, and the third portion 63 may be formed of separate plate members, and these plate members may be welded to form the cover member 6. For improving corrosion resistance, surface treatment with nickel plating (e.g., electroless nickel plating) may be performed for the surface of the cover member 6. For easily absorbing radiation from the rotor 4, black plating with a high emissivity, such as black nickel plating, may be used. Instead of nickel plating and black nickel plating, surface treatment with nickel plating or black nickel plating containing fluorine resin may be performed.

As shown in FIG. 3, one end of the cover member 6 on an outer peripheral side thereof contacts the gas-discharge-downstream-side end portion of the stator cylindrical portion 32. Specifically, one end of the second portion 62 contacts the gas-discharge-downstream-side end portion of the stator cylindrical portion 32. On the other hand, the other end of the cover member 6 on an inner peripheral side thereof extends from the third internal space S3 to a position overlapping with an inner peripheral surface of the rotor cylindrical portion 23. Specifically, one end of the third portion 63 extends from the third internal space S3 to a position overlapping with the inner peripheral surface of the rotor cylindrical portion 23.

As described above, in the vacuum pump 1, one end of the cover member 6 on the outer peripheral side thereof, i.e., one end of the second portion 62, contacts the gas-discharge-downstream-side end portion of the stator cylindrical portion 32. With this configuration, the cover member 6 is brought into the substantially same temperature as that of the stator cylindrical portion 32. For heating the stator cylindrical portion 32, the vacuum pump 1 includes a heater 7. The heater 7 is provided at the base 3. The heater 7 heats the base 3 to heat the stator cylindrical portion 32 thermally contacting the base 3. The heater 7 may be fixed to the outer periphery of the base 3 as shown in FIG. 3, or may be embedded in the base 3. The stator cylindrical portion 32 is, by the heater 7, heated to such a temperature that the reactive product is not generated. The temperature of heating of the stator cylindrical portion 32 can be set as necessary according to, e.g., gas used inside the attachment target or the type of reactive product. Such a heating temperature is 150° C., for example.

Since the stator cylindrical portion 32 is heated to the above-described temperature, the cover member 6 is also heated to such a temperature that the reactive product is not generated, and therefore, generation of the reactive product on the cover member 6 is reduced. Moreover, the inner wall surface 15C of the base 3 is heated by radiation from the other end of the cover member 6 on the inner peripheral side thereof. Accordingly, generation of the reactive product on the base 3 is also reduced.

Moreover, in the vacuum pump 1, the other end of the cover member 6 on the inner peripheral side thereof, i.e., one end of the third portion 63, extends from the third internal space S3 to the position overlapping with the inner peripheral surface of the rotor cylindrical portion 23. This can reduce gas discharged into the third internal space S3 from entering a space between the rotor cylindrical portion 23 and the base 3 and/or a space between the third portion 63 of the cover member 6 and the base 3. As a result, generation of the reactive product on the base 3, the rotor cylindrical portion 23, and the cover member 6 (the third portion 63) is reduced.

The length of the overlap between the third portion 63 and the gas-discharge-downstream-side surface of the rotor cylindrical portion 23 is set to such a length that the rotor 4 is not excessively heated by the cover member 6. For example, such an overlap length is equal to or less than 50% of the length of the rotor cylindrical portion 23, preferably about 10% of the length of the rotor cylindrical portion 23. This can prevent contact of the rotor 4 with other members of the vacuum pump 1 due to expansion of the rotor 4.

The vacuum pump 1 includes a purge gas supply device 8. The purge gas supply device 8 includes a purge port 81 and a gas flow path 82. The purge port 81 is connected to a purge gas supply source (not shown). The purge port 81 is connected to the gas flow path 82. The gas flow path 82 communicates with the first gap G1 between the base 3 and the shaft 21. The first gap G1 communicates with the second internal space S2. Purge gas injected into the purge port 81 from the purge gas supply source passes through the gas flow path 82 and the first gap G1, and is injected into the second internal space S2. The purge gas injected into the second internal space S2 is discharged in the gas-discharge downstream direction from a second gap G2 formed between the other end (the third portion 63) of the cover member 6 on the inner peripheral side thereof and the inner peripheral surface of the rotor cylindrical portion 23. Accordingly, the purge gas discharged from the second gap G2 is discharged into the third internal space S3, and is further discharged from the exhaust port 16. The purge gas is, for example, inert gas such as nitrogen gas.

The purge gas is discharged into the third internal space S3 from the second gap G2. This can reduce gas discharged into the third internal space S3 from the screw groove pump portion from entering the second internal space S2 through the second gap G2. As a result, generation of the reactive product on the base 3 and the side wall of the rotor 4 forming the second internal space S2 can be reduced.

The vacuum pump 1 includes a seal member 9. The seal member 9 has a ring shape as viewed in plane. The section of the seal member 9 is in an L-shape. The seal member 9 is arranged between the base 3 and the rotor cylindrical portion 23. Specifically, the short side of the L-shape of the seal member 9 is fixed to a raised portion provided at the base 3. On the other hand, the long side of the L-shape of the seal member 9 faces, above the other end of the cover member 6 on the inner peripheral side thereof, the inner peripheral surface of the rotor cylindrical portion 23. A screw groove is formed in the axial direction A1 at the surface, which faces the rotor cylindrical portion 23, of the long side of the L-shape of the seal member 9. A third gap G3 is provided between the long side of the L-shape of the seal member 9 and the inner peripheral surface of the rotor cylindrical portion 23, and the third gap G3 is narrow enough.

Since the screw groove is formed at the surface, which faces the rotor cylindrical portion 23, of the long side of the L-shape of the seal member 9, and the third gap G3 between the seal member 9 and the rotor cylindrical portion 23 is formed narrow, a gas flow in the gas-discharge downstream direction, i.e., the direction toward the third internal space S3, is generated in the third gap G3 when the rotor 4 is rotated at a high speed. This can reduce, as a result, gas discharged into the third internal space S3 from the screw groove pump portion formed by the rotor cylindrical portion 23 and the stator cylindrical portion 32 from entering the second internal space S2 through the second gap G2 and the third gap G3. Note that the screw groove is not necessarily formed at the long side of the L-shape of the seal member 9 as long as the gas flow in the gas-discharge downstream direction can be generated in the third gap G3 when the rotor 4 is rotated at the high speed.

Upon assembly of the vacuum pump 1, the cover member 6 is inserted into the base 3 from above and is attached to the inner wall portion 15, and thereafter, the rotor 4 is assembled with the base 3. In this case, for overlapping one end of the third portion 63 of the cover member 6 with the inner peripheral surface of the rotor cylindrical portion 23, the base 3 needs to be formed such that the clearance between the base 3 and the rotor cylindrical portion 23 has a thickness of equal to or greater than the thickness of the third portion 63. In a case where the clearance between the base 3 and the rotor cylindrical portion 23 has the thickness of equal to or greater than the thickness of the third portion 63, even when the rotor 4 is rotated at the high speed, the gas flow in the gas-discharge downstream direction is less likely to be generated in such a clearance in the complete vacuum pump 1. As a result, gas discharged into the third internal space S3 easily enters the second internal space S2 through such a clearance.

For this reason, the configuration in which the seal member 9 is formed as a separate member and the seal member 9 is placed to face the rotor cylindrical portion 23 after the cover member 6 has been inserted into the base 3 from above and has been attached to the inner wall portion 15 is employed so that the narrow third gap G3 can be formed between the base 3 (the seal member 9) and the rotor cylindrical portion 23. As a result, when the rotor 4 is rotated at the high speed, the gas flow in the gas-discharge downstream direction is easily generated in the third gap G3 between the seal member 9 and the rotor cylindrical portion 23.

In the vacuum pump 1 according to the present embodiment as described above, the other end of the cover member 6, i.e., one end of the third portion 63, extends from the third internal space S3 to the position overlapping with the inner peripheral surface of the rotor cylindrical portion 23. This can reduce gas discharged by the rotor 4 and the stator 5 from entering the space between the rotor cylindrical portion 23 and the base 3 and/or the space between the cover member 6 and the base 3.

Moreover, in the vacuum pump 1 according to the present embodiment, the stator cylindrical portion 32 is heated by the heater 7, and one end (the second portion 62) of the cover member 6 contacts, in the third internal space S3, the gas-discharge-downstream-side end portion of the stator cylindrical portion 32. Accordingly, the cover member 6 is heated, and a portion of the base 3 in the vicinity of the cover member 6 is also heated. As a result, generation of the reactive product on the cover member 6 and the base 3 can be reduced.

One embodiment of the present invention has been described above, but the present invention is not limited to the above-described embodiment and various changes can be made without departing from the gist of the invention. For example, since the rotor cylinder portion spontaneously raises the temperature due to high-speed rotation, the temperature of the stator cylinder portion 32 and the cover member 6 may be raised only by the radiant heat from the rotor cylinder portion 23. Further, even when the heater 7 is provided, one end on the outer peripheral side of the cover member 6 is brought into contact with the side surface of the stator cylindrical portion 32 or in contact with the base instead of the end on the exhaust downstream side of the stator cylindrical portion 32. Thereby, the cover member 6 may be indirectly heated by the heater 7.

The vacuum pump 1 according to the above-described embodiment is a pump configured such that the turbo-molecular pump portion formed by the multiple stages of the rotor blades 22 and the multiple stages of the stator blades 31 and the screw groove pump portion formed by the rotor cylindrical portion 23 and the stator cylindrical portion 32 are integrated with each other. However, the screw groove pump portion may be omitted. That is, the vacuum pump 1 may be a turbo-molecular pump. Alternatively, the turbo-molecular pump portion may be omitted. That is, the vacuum pump 1 may be a screw groove pump.

Figure 4:
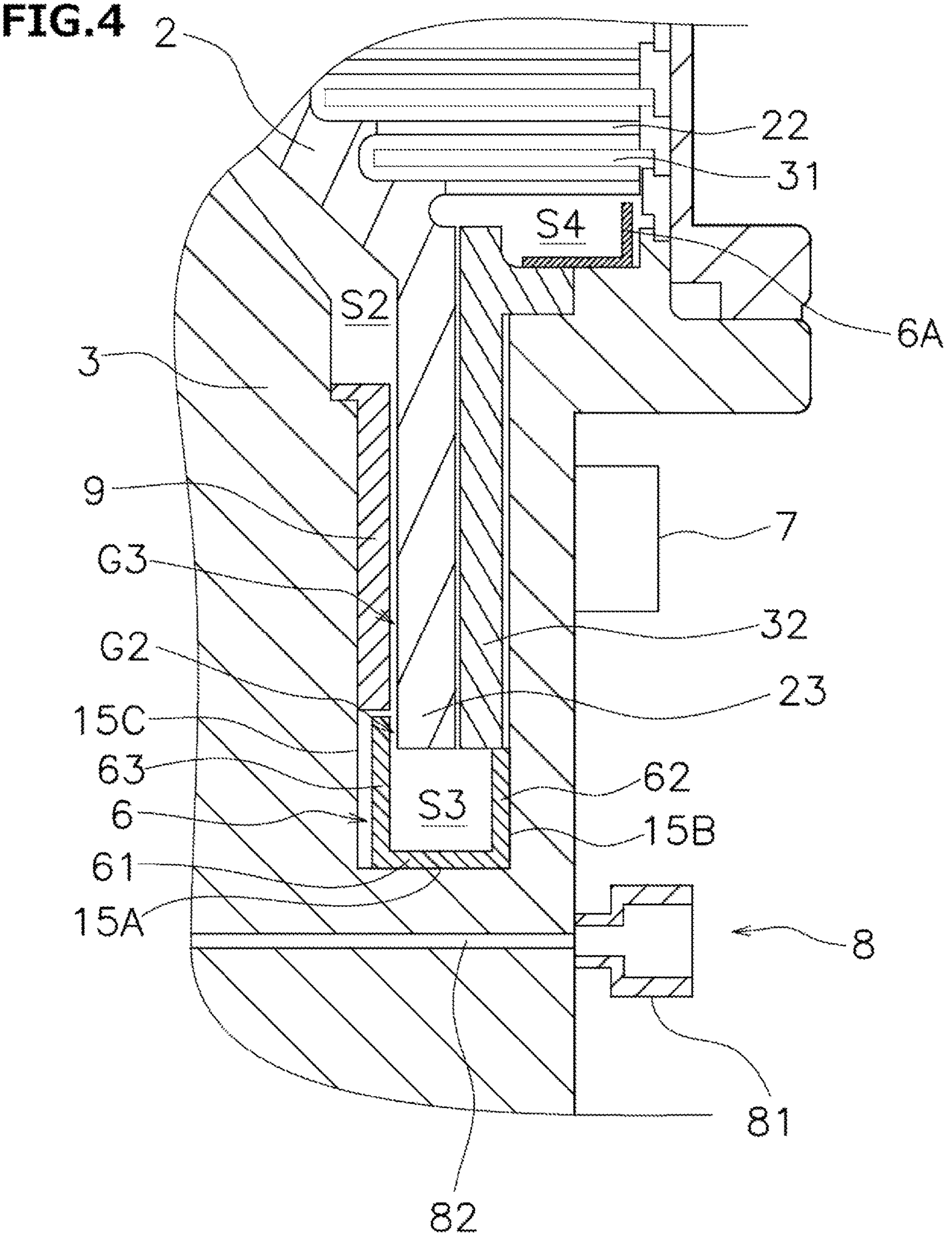
FIG. 4 is a view showing a variation in terms of an attachment position of the cover member.
Figure 5:
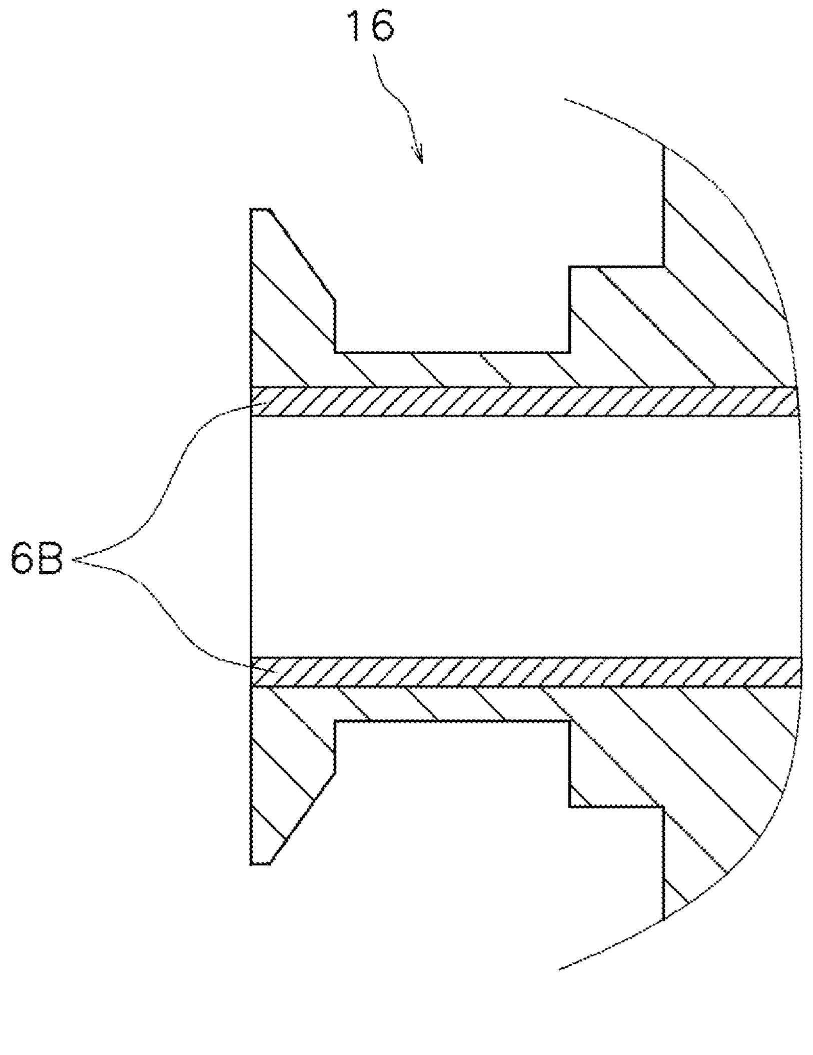
FIG. 5 is a view showing another variation in terms of an attachment position of a cover member.

A member similar to the cover member 6 may be provided in the gas discharge path other than the inner wall portion 15 of the base 3 forming the third internal space S3. For example, as shown in FIG. 4, a cover member 6A may be provided in a fourth internal space S4 formed between the turbo-molecular pump portion and the screw groove pump portion. Alternatively, as shown in FIG. 5, a cover member 6B may be provided on an inner wall portion of the exhaust port 16. FIGS. 4 and 5 are views showing variations in terms of the attachment position of the cover member 6.

Those skilled in the art understand that the above-described multiple exemplary embodiments are specific examples of the following aspects.

First Aspect

A vacuum pump comprises: a rotor having multiple stages of rotor blades and a rotor cylindrical portion; a stator having multiple stages of stator blades and a stator cylindrical portion; a base housing the rotor and the stator; and a cover member configured to cover an inner wall portion of the base forming an internal space positioned on a gas-discharge downstream side with respect to gas-discharge-downstream-side end portions of the rotor cylindrical portion and the stator cylindrical portion. An inner peripheral side end of the cover member extends from the internal space to a position overlapping with an inner peripheral surface of the rotor cylindrical portion.

In a vacuum pump according to a first aspect, the inner peripheral side end of the cover member extends from the inner space to the position overlapping with the inner peripheral surface of the rotor cylindrical portion. This can reduce gas discharged by the rotor and the stator from entering the space between the rotor cylindrical portion and the base and/or the space between the cover member and the base. As a result, generation of a reactive product on the base can be reduced.

Second Aspect

The cover member is formed in a ring shape.

In a vacuum pump according to a second aspect, a cover member is easily attached to the vacuum pump.

Third Aspect

The cover member has a first portion covering a bottom surface of the inner wall portion of the base, a second portion covering an outer wall surface of the inner wall portion of the base and continuously connected to the first portion, and a third portion covering an inner wall surface of the inner wall portion of the base and continuously connected to the first portion. The third portion extends from the internal space to a position overlapping with the inner peripheral surface of the rotor cylindrical portion.

In a vacuum pump according to a third aspect, a third portion of a cover member extends from an internal space to a position overlapping with an inner peripheral surface of a rotor cylindrical portion. This can reduce gas discharged by a rotor and a stator from entering a space between the rotor cylindrical portion and a base and/or a space between the cover member and the base. As a result, generation of a reactive product on the base can be reduced.

Fourth Aspect

The vacuum pump further comprises: a seal member provided above the inner peripheral side end of the cover member to face the inner peripheral surface of the rotor cylindrical portion.

In a vacuum pump according to a fourth aspect, a narrow clearance is formed between a seal member and a rotor cylindrical portion so that a gas flow in a gas-discharge downstream direction can be generated. As a result, entrance of discharged gas through the above-described clearance can be reduced.

Fifth Aspect

The vacuum pump further comprises: a purge gas supply device configured to supply purge gas in a gas-discharge downstream direction to a clearance formed between the inner peripheral side end of the cover member and the inner peripheral surface of the rotor cylindrical portion.

A purge gas supply device supplies purge gas in a gas-discharge downstream direction to a clearance formed between the inner peripheral side end of a cover member and an inner peripheral surface of a rotor cylindrical portion. Thus, entrance of discharged gas through the clearance formed between the other end of the cover member and the inner peripheral surface of the rotor cylindrical portion can be reduced.

Sixth Aspect

The seal member is formed as a member separated from the base, and is connected to the base.

A configuration in which a seal member is formed as a separate member and the seal member is placed to face a rotor cylindrical portion after a cover member has been inserted into a base from above and has been attached to an inner wall portion is employed so that a narrow gap can be formed between the seal member and the rotor cylindrical portion. As a result, a gas flow in a gas-discharge downstream direction is easily generated.

Seventh Aspect

A length of an overlap between the inner peripheral side end of the cover member and the inner peripheral surface of the rotor cylindrical portion is equal to or less than 50% of a length of the rotor cylindrical portion in an axial direction.

Contact of a rotor with other members of a vacuum pump due to expansion of the rotor can be prevented.

Eighth Aspect

A length of an overlap between the inner peripheral side end of the cover member and the inner peripheral surface of the rotor cylindrical portion is equal to or less than 10% of a length of the rotor cylindrical portion in an axial direction.

Contact of a rotor with other members of a vacuum pump due to expansion of the rotor can be prevented.

Ninth Aspect

A screw groove is formed in an axial direction at a surface of the seal member.

Tenth Aspect

The vacuum pump further comprises: a heater configured to heat the stator cylindrical portion. An outer peripheral side end of the cover member is heated by the heater. Accordingly, the cover member is heated, and a portion of the base in the vicinity of the cover member is also heated. As a result, generation of a reactive product on the cover member and the base can be reduced.

Eleventh Aspect

An outer peripheral side end of the cover member contacts, in the internal space, the gas-discharge-downstream-side end portion of the stator cylindrical portion. Accordingly, the cover member is heated, and a portion of the base in the vicinity of the cover member is also heated. As a result, generation of a reactive product on the cover member and the base can be reduced.

Twelfth Aspect

The vacuum pump further comprises: a heater configured to heat the stator cylindrical portion. Accordingly, the cover member is heated, and a portion of the base in the vicinity of the cover member is also heated. As a result, generation of a reactive product on the cover member and the base can be reduced.

What is claimed is:

1. A vacuum pump comprising:

a rotor having multiple stages of rotor blades and a rotor cylindrical portion;

a stator having multiple stages of stator blades and a stator cylindrical portion;

a base housing the rotor and the stator; and a cover member configured to cover an inner wall portion of the base forming an internal space positioned on a gas-discharge downstream side with respect to gas-discharge-downstream-side end portions of the rotor cylindrical portion and the stator cylindrical portion, wherein the cover member has a first portion covering and fixed to a bottom surface of the inner wall portion of the base, a second portion covering an outer wall surface of the inner wall portion of the base and continuously connected to the first portion, and a third portion covering an inner wall surface of the inner wall portion of the base and continuously connected to the first portion, the third portion extends from the internal space to a position overlapping with the inner peripheral surface of the rotor cylindrical portion, and wherein the first portion is disposed between the second portion and the third portion; and wherein the first portion is in continuous contact with the bottom surface of the inner wall portion of the base.

2. The vacuum pump according to claim 1, wherein the cover member is formed in a ring shape.

3. The vacuum pump according to claim 1, further comprising:

a purge gas supply device configured to supply purge gas in a gas-discharge downstream direction to a clearance formed between the inner peripheral side end of the cover member and the inner peripheral surface of the rotor cylindrical portion.

4. The vacuum pump according to claim 1, wherein a length of an overlap between the inner peripheral side end of the cover member and the inner peripheral surface of the rotor cylindrical portion is equal to or less than 50% of a length of the rotor cylindrical portion in an axial direction.

5. The vacuum pump according to claim 1, wherein a length of an overlap between the inner peripheral side end of the cover member and the inner peripheral surface of the rotor cylindrical portion is equal to or less than 10% of a length of the rotor cylindrical portion in an axial direction.

6. The vacuum pump according to claim 1 further comprising:

a heater configured to heat the stator cylindrical portion; wherein an outer peripheral side end of the cover member is heated by the heater.

7. The vacuum pump according to claim 1; wherein an outer peripheral side end of the cover member contacts, in the internal space, the gas-discharge-downstream-side end portion of the stator cylindrical portion.

8. The vacuum pump according to claim 7 further comprising:

a heater configured to heat the stator cylindrical portion.

* * * * *